(12) United States Patent
Mizobuchi

(10) Patent No.: US 11,394,877 B2
(45) Date of Patent: Jul. 19, 2022

(54) CONTROL APPARATUS, IMAGE PICKUP APPARATUS, AND CONTROL METHOD

(71) Applicant: CANON KABUSHIKI KAISHA, Tokyo (JP)

(72) Inventor: Yasuhiro Mizobuchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/028,742

(22) Filed: Sep. 22, 2020

(65) Prior Publication Data

US 2021/0099640 A1    Apr. 1, 2021

(30) Foreign Application Priority Data

Sep. 30, 2019    (JP) .............................. JP2019-180369

(51) Int. Cl.
*H04N 5/232*    (2006.01)
*G06V 40/16*    (2022.01)

(52) U.S. Cl.
CPC ....... *H04N 5/23222* (2013.01); *G06V 40/166* (2022.01); *G06V 40/172* (2022.01); *H04N 5/23296* (2013.01); *H04N 5/23299* (2018.08)

(58) Field of Classification Search
CPC ........... H04N 5/23222; H04N 5/23299; H04N 5/23296; H04N 5/23218; G06K 9/00288; G06K 9/00255; G06K 9/00221; G06K 9/32
See application file for complete search history.

(56) References Cited

U.S. PATENT DOCUMENTS

| | | | | |
|---|---|---|---|---|
| 2008/0199056 A1* | 8/2008 | Tokuse | ............... | G06K 9/00295 382/118 |
| 2013/0027510 A1* | 1/2013 | Tsubusaki | .......... | H04N 5/23287 348/36 |
| 2015/0077568 A1* | 3/2015 | Tsunematsu | ..... | G08B 13/19645 348/159 |

FOREIGN PATENT DOCUMENTS

| | | |
|---|---|---|
| JP | 2008-61032 A | 3/2008 |
| JP | 2010-087613 A | 4/2010 |

\* cited by examiner

*Primary Examiner* — Tat C Chio
(74) *Attorney, Agent, or Firm* — Canon U.S.A., Inc. IP Division

(57) ABSTRACT

A control apparatus includes one or more processors which functions as a detection unit configured to acquire image data captured by an image pickup unit and detect an object from the image data, a capturing control unit configured to output an instruction to start capturing to the image pickup unit to cause the image pickup unit to automatically capture moving images, a camerawork decision unit configured to decide camerawork to be given to the moving images based on information indicating a detection result from the detection unit, and a control unit configured to perform control to change at least one of a composition of the image pickup unit and a focus of the photographic optical system with a predetermined pattern during the capturing of the moving images based on a decision result from the camerawork decision unit.

20 Claims, 15 Drawing Sheets

FIG.15

| ZOOM POSITION zp | RELATIVE ANGLE OF VIEW aov(zp) | ZOOM POSITION zp | RELATIVE ANGLE OF VIEW aov(zp) |
|---|---|---|---|
| 0 | 1000 | 51 | 702 |
| 1 | 993 | 52 | 698 |
| 2 | 986 | 53 | 693 |
| 3 | 979 | 54 | 688 |
| 4 | 973 | 55 | 683 |
| 5 | 966 | 56 | 679 |
| 6 | 959 | 57 | 674 |
| 7 | 953 | 58 | 669 |
| 8 | 946 | 59 | 665 |
| 9 | 940 | 60 | 660 |
| 10 | 933 | 61 | 655 |
| 11 | 927 | 62 | 651 |
| 12 | 920 | 63 | 646 |
| 13 | 914 | 64 | 642 |
| 14 | 908 | 65 | 638 |
| 15 | 901 | 66 | 633 |
| 16 | 895 | 67 | 629 |
| 17 | 889 | 68 | 624 |
| 18 | 883 | 69 | 620 |
| 19 | 877 | 70 | 616 |
| 20 | 871 | 71 | 612 |
| 21 | 865 | 72 | 607 |
| 22 | 859 | 73 | 603 |
| 23 | 853 | 74 | 599 |
| 24 | 847 | 75 | 595 |
| 25 | 841 | 76 | 591 |
| 26 | 835 | 77 | 587 |
| 27 | 829 | 78 | 583 |
| 28 | 824 | 79 | 579 |
| 29 | 818 | 80 | 575 |
| 30 | 812 | 81 | 571 |
| 31 | 807 | 82 | 567 |
| 32 | 801 | 83 | 563 |
| 33 | 796 | 84 | 559 |
| 34 | 790 | 85 | 555 |
| 35 | 785 | 86 | 551 |
| 36 | 779 | 87 | 548 |
| 37 | 774 | 88 | 544 |
| 38 | 769 | 89 | 540 |
| 39 | 763 | 90 | 536 |
| 40 | 758 | 91 | 533 |
| 41 | 753 | 92 | 529 |
| 42 | 748 | 93 | 525 |
| 43 | 743 | 94 | 522 |
| 44 | 737 | 95 | 518 |
| 45 | 732 | 96 | 514 |
| 46 | 727 | 97 | 511 |
| 47 | 722 | 98 | 507 |
| 48 | 717 | 99 | 504 |
| 49 | 712 | 100 | 500 |
| 50 | 707 | | |

CONTROL APPARATUS, IMAGE PICKUP APPARATUS, AND CONTROL METHOD

BACKGROUND OF THE DISCLOSURE

Field of the Disclosure

The aspect of the embodiments relates to a control apparatus, especially an image pickup control apparatus controlling an image pickup unit that automatically captures moving images, an image pickup apparatus including the image pickup control apparatus, and a control method.

Description of the Related Art

In recent years, an automatic capturing camera, which continuously performs capturing on a periodic basis without a user's instruction for capturing, has been developed and gone into practical use. For example, there is a life-log camera that is used in a state of being worn on the body of a user with a strap or the like and records scenes the user sees in daily life as video images at regular time intervals. Furthermore, there is an automatic capturing camera that recognizes, for example, a smile, a human face, a dog, a cat, and a quick movement, and releases the shutter.

On the other hand, a reproduction apparatus, which consecutively reproduces images when reproducing images captured by a camera, has been widely known. For example, there is a reproduction apparatus that has, for example, a slide-show function to consecutively reproduce designated images, and a digest moving image creation function to compile freely-selected or automatically selected images into one piece of video. It is desirable that such a reproduction apparatus reproduces still images and moving images (videos) having a wide range of variations.

As a technology of solving the issues described above, Japanese Patent Application Laid-Open No. 2008-61032 discusses a technology of inserting an effect corresponding to attribute information of images to reproduce accumulated images and reproducing the images by increasing a variations of image reproduction.

An image reproduction apparatus discussed in Japanese Patent Application Laid-Open No. 2008-61032 adds an appropriate effect to captured target images using a parameter stored together with the image. Thus, a user can perform capturing without being conscious of an effect and view a slide-show or moving images to which an appropriate effect is added at the time of reproduction.

However, since the image reproduction apparatus discussed in Japanese Patent Application Laid-Open No. 2008-61032 adds an effect to the captured images, the user needs to intentionally add, at the time of capturing, camerawork including a background or an object that is not an image pickup target. To add an effect including a person outside an angle of view, for example, the user needs to recognize a surrounding situation outside the angle of view and perform appropriate camerawork based on the surrounding situation.

On the other hand, in the image pickup apparatus that automatically captures moving images, object and composition variations are limited when a camera and an object are physically less movable relative to an installation location of the camera and a location of the object, respectively.

SUMMARY OF THE DISCLOSURE

A control apparatus according to an aspect of the embodiments includes one or more processors which functions as a detection unit configured to acquire image data captured by an image pickup unit for acquiring the image data based on light from a photographic optical system, and detect an object from the image data, a capturing control unit configured to output an instruction to start capturing to the image pickup unit to cause the image pickup unit to capture moving images, a decision unit configured to decide camerawork to be given to the moving images automatically captured by the capturing control unit based on information indicating a detection result of the object from the detection unit, and a control unit configured to perform control to change at least one of a composition of the image pickup unit and a focus of the photographic optical system with a predetermined pattern during the capturing of the moving images by the capturing unit based on a decision result from the decision unit.

Further features of the disclosure will become apparent from the following description of exemplary embodiments with reference to the attached drawings.

BRIEF DESCRIPTION OF THE DRAWINGS

FIG. 15 is a diagram for illustrating a relationship between a zoom position and a relative angle of view according to the present exemplary embodiment.

DESCRIPTION OF THE EMBODIMENTS

Figure 1A:
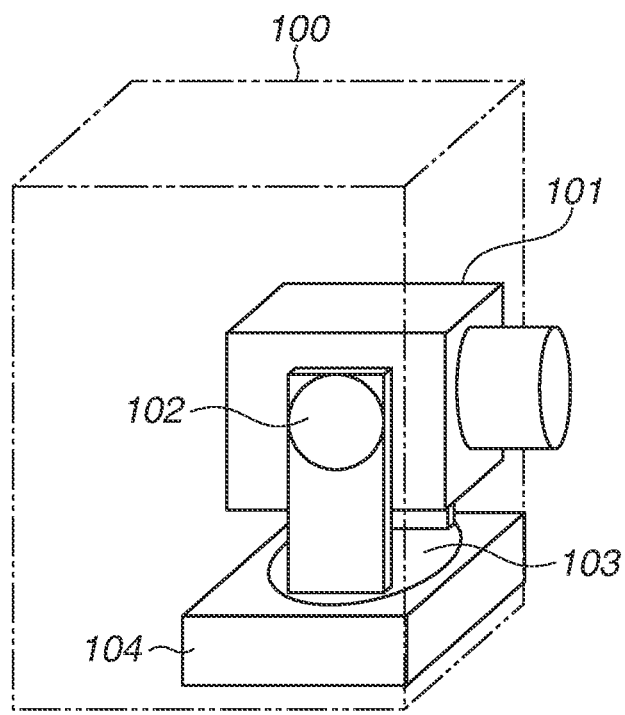
FIG. 1A is a schematic diagram illustrating an image pickup apparatus according to an exemplary embodiment.

An exemplary embodiment of the aspect of the embodiments will be described in detail below with reference to the accompanying drawings.

In the drawings, the same member is denoted by the same reference sign and the description thereof is omitted.

As described above, in an image pickup apparatus that automatically captures moving images (videos), object and composition variations are limited when a camera and an object are physically less movable relative to an installation location of the camera and a location of the object, respectively. Thus, it is assumed that capturing of moving images having a wide range of variations is desired.

In the present exemplary embodiment, a description will be given of an example of deciding camerawork to be given among a plurality of camerawork candidates based on information of a detected object, and changing at least one of a capturing direction, zooming, or a focus with a pattern corresponding to the decided camerawork. This can increase variations of moving images even in capturing of moving images using the image pickup apparatus that performs automatic capturing.

FIG. 1 is a schematic diagram illustrating an image pickup apparatus 100 according to the present exemplary embodiment.

The image pickup apparatus 100 includes a lens barrel 101 as an image pickup means, a tilt rotation unit 102 that drives the lens barrel 101 in a tilt direction, a pan rotation unit 103 that drives the lens barrel 101 in a pan direction, and a control box 104 that controls image-pickup by the lens barrel 101. The tilt rotation unit 102 and the pan rotation unit 103 function as a composition change means that changes a capturing direction of the image pickup means.

The lens barrel 101 is an image pickup means that includes an image pickup optical system that performs image-pickup and an image pickup element that acquires image data based on light from a photographic optical system. The lens barrel 101 is mounted on the image pickup apparatus 100 via a rotation mechanism that can drive the lens barrel 101 to rotate with respect to a fixing portion (not illustrated) of the image pickup apparatus 100.

Figure 1B:
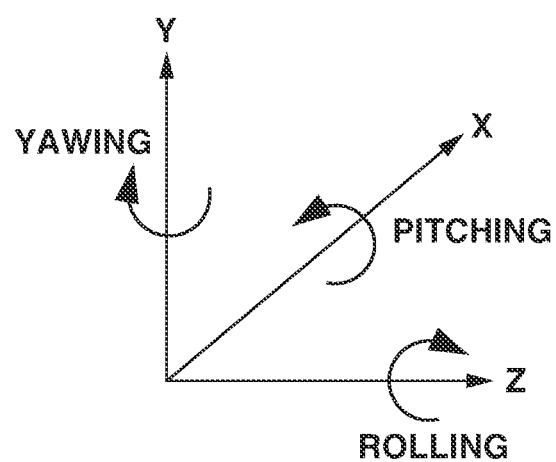
FIG. 1B is a schematic diagram illustrating rotation directions of the image pickup apparatus according to the present exemplary embodiment.

The tilt rotation unit 102 includes a motor as an actuator and a rotation mechanism (motor driving mechanism) that drives the lens barrel 101 to rotate with the motor so that the lens barrel 101 can rotate in a pitch direction illustrated in FIG. 1B.

The pan rotation unit 103 includes the motor as the actuator configured to rotate the lens barrel 101 in a yaw direction illustrated in FIG. 1B, and the rotation mechanism (motor driving mechanism) that is driven to rotate by the motor. A rotation about a horizontal axis (X-axis) of the image pickup apparatus 100 is referred to as pitching, a rotation about a vertical axis (Y-axis) is referred to as yawing, and a rotation about an axis (Z-axis) in a depth (optical axis) direction is referred to as rolling.

The control box 104 includes a control microcomputer or the like to control a capturing lens group included in the lens barrel 101, the tilt rotation unit 102, and the pan rotation unit 103. In the present exemplary embodiment, the control box 104 is arranged in the fixing portion of the image pickup apparatus and is fixed even when the lens barrel 101 is driven in the pan/tilt direction.

Processing executed by the control box 104 will be described in detail below with reference to FIG. 2.

Figure 2:
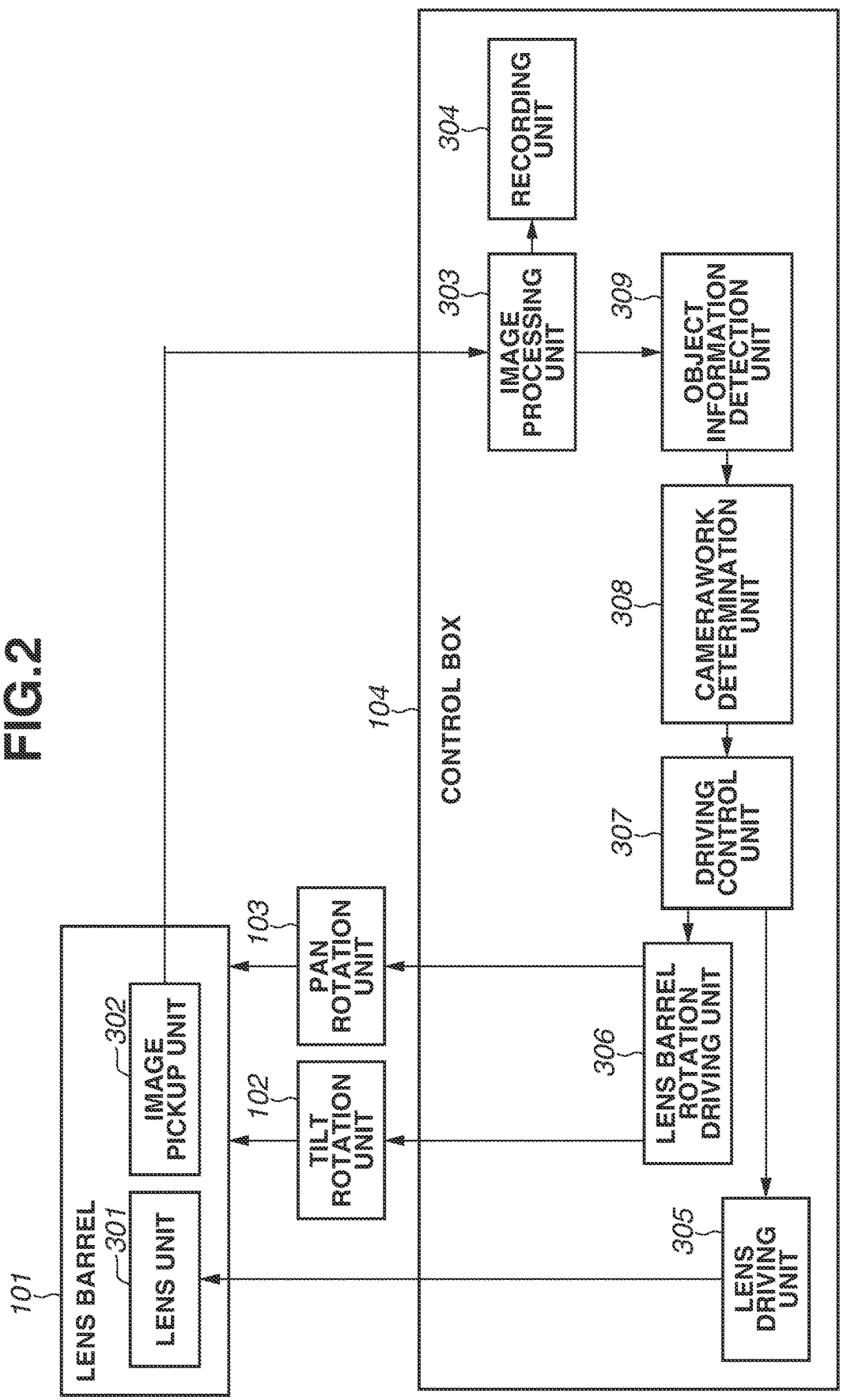
FIG. 2 is a block diagram illustrating a configuration of the image pickup apparatus according to the present exemplary embodiment.

FIG. 2 is a block diagram illustrating a configuration of the image pickup apparatus 100 according to the present exemplary embodiment composed of the lens barrel 101, the tilt rotation unit 102, the pan rotation unit 103, and the control box 104.

The lens barrel 101 includes a lens unit 301 constituting the photographic optical system, and an image pickup unit 302 including the image pickup element. The lens barrel 101 is controlled to rotate in the tilt direction by the tilt rotation unit 102 and in the pan direction by the pan rotation unit 103.

The lens unit 301 constituting the photographic optical system is composed of, for example, a zoom lens as a zoom driving mechanism and a focus lens as a means of changing a focus, and drive-controlled by a lens driving unit 305. A zoom mechanism is composed of the zoom lens and the lens driving unit 305 that drives the zoom lens, and the zoom lens is moved in an optical axis direction by the lens driving unit 305, thereby achieving a zoom function.

The image pickup unit 302 includes the image pickup element that receives light incident thereon through each lens group constituting the lens unit 301, and outputs charge information in accordance with an amount of the received light as digital image data to an image processing unit 303.

The tilt rotation unit 102 includes the motor driving mechanism that can rotate the lens barrel 101 in the pitch direction. Further, the pan rotation unit 103 includes the motor driving mechanism that can rotate the lens barrel 101 in the yaw direction. The tilt rotation unit 102 and the pan rotation unit 103 drive the lens barrel 101 to rotate in response to a driving instruction input from a lens barrel rotation driving unit 306.

The control box 104 includes the image processing unit 303, a recording unit 304, the lens driving unit 305, the lens barrel rotation driving unit 306, a driving control unit 307, a camerawork determination unit 308, and an object information detection unit 309. A capturing direction of the image pickup apparatus is controlled by the driving control unit 307 and the lens barrel rotation driving unit 306. Details of each unit will be described below.

The image processing unit 303 acquires digital image data output from the image pickup unit 302. The image processing unit 303 executes image processing, such as distortion correction, white balance adjustment, and color interpolation processing, on the digital image data, and outputs the processed digital image data to the recording unit 304 and the object information detection unit 309.

The recording unit 304 converts the digital image data output from the image processing unit 303 into a recording format such as a Motion Picture Experts Group (MPEG) format, and records the data in a recording medium such as a non-volatile memory (not illustrated). The recording unit 304 records, in association with the recorded moving image data, information when the moving image data has been captured (referred to as past capturing information). The past capturing information includes a type of camerawork at the time of the capturing and object information of the captured object, which will be described below.

The object information detection unit 309 as an object detection means detects the object from the digital image data input from the image processing unit 303. Furthermore, the object information detection unit 309 extracts object information from a portion of a face area of the detected object, and outputs the extracted object information as an object detection result to the camerawork determination unit 308. Examples of the object information include a size of a detected face, a position of a face on a captured image, a face orientation, and a registered object identification result. To extract these pieces of information, the object information detection unit 309 includes a means of determining the face orientation of the object, a means of detecting the position of the face, a means of detecting the face size, a means of registering the object, and a means of uniquely identifying (personal authentication and object recognition) of the registered object. The registered object identification result is a result of identifying whether images of a specific object are captured.

The object information detection unit 309 compares a feature amount extracted from information such as a photograph of the face of the specific object registered in advance by the means of registering the object and a feature amount of the detected object to acquire a degree of coincidence, and identifies whether the images of the specific object are captured. When the detected object is an individual person, the registered object identification result is a result of individual authentication processing. When the detected object is a physical object, the registered object identification result is a result of physical object recognition processing. The individual authentication processing and the physical object recognition processing are collectively referred to as identification processing. An identification result is input to the camerawork determination unit 308. The identification result is represented by a numeric value uniquely allocated at the time of registering the object. When images of a plurality of objects are captured at the same time, identification is executed on the respective objects, and all the identification results are input to the camerawork determination unit 308.

The camerawork determination unit 308 as a camerawork determination means determines (decides) a preferable type of camerawork among a plurality of camerawork candidates based on the object information such as positional information of the face and the face orientation input from the object information detection unit 309. The camerawork determination unit 308 outputs the determined type of camerawork and the object information input from the object information detection unit 309 to the driving control unit 307. Determination processing of a type of camerawork and details of each type of camerawork will be described in detail below.

The driving control unit 307 as an automatic capturing control means executes a variety of processing for automatic capturing without intervention of operations by a user. Based on the type of camerawork (decision result of camerawork) input from the camerawork determination unit 308 and the object information, the driving control unit 307 acquires a loci of lens driving and lens barrel rotation driving that are required for achieving the camerawork. The driving control unit 307 decides a target position and a driving velocity to perform the lens driving and the lens barrel rotation driving. The driving control unit 307 outputs respective decided parameters to the lens driving unit 305 and the lens barrel rotation driving unit 306. The driving control unit 307 controls automatic capturing (automatic capturing control) by outputting instructions for the start and end of capturing at appropriate timing for each camerawork type to the recording unit 304. Here, the example of designating the target position and the driving velocity as an input to the lens barrel rotation driving unit 306 and an output from the driving control unit 307 is shown. However, designated values are not limited thereto. For example, an acceleration and time division data to the target position may be designated.

The lens driving unit 305 includes a motor and driver unit to drive the zoom lens and the focus lens included in the lens unit 301. The lens driving unit 305 drives each lens based on the target position and the driving velocity that are input from the driving control unit 307.

The lens barrel rotation driving unit 306 outputs driving instructions to the tilt rotation unit 102 and the pan rotation unit 103 based on the target position and the driving velocity that are input from the driving control unit 307, and drives the lens barrel 101 in the tilt direction and the pan direction, respectively.

Figure 3:
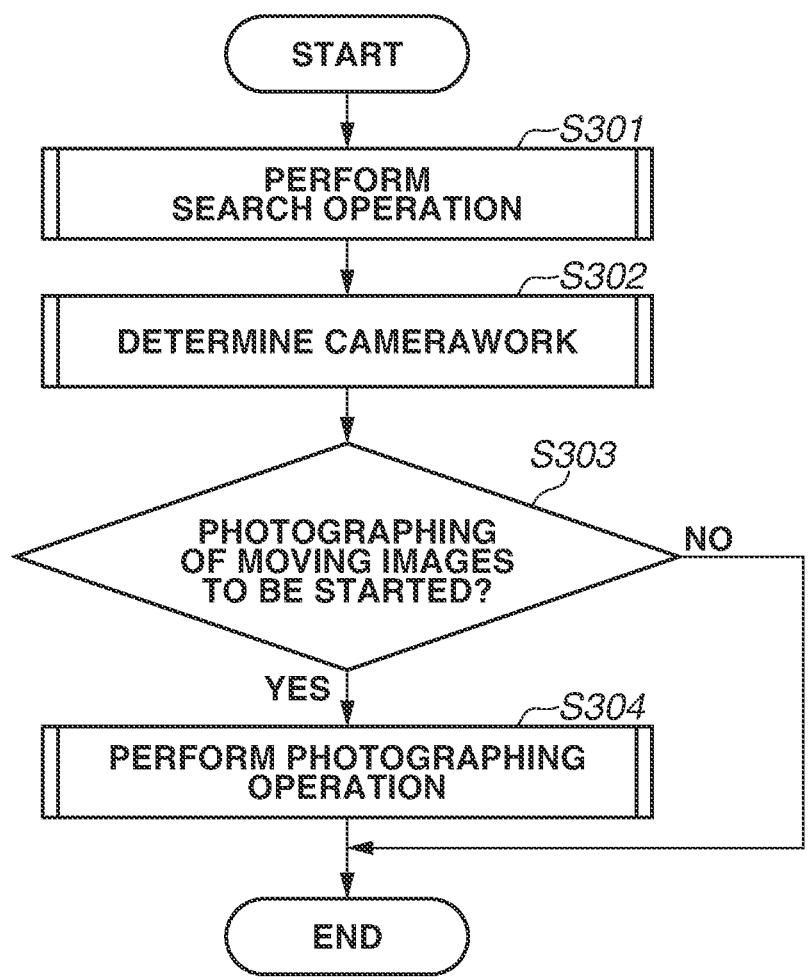
FIG. 3 is a flowchart for illustrating g a capturing operation performed by the image pickup apparatus according to the present exemplary embodiment.

FIG. 3 is a flowchart illustrating the overall flow of processing of capturing the moving images by automatically adding camerawork according to the present exemplary embodiment. In step S301, when the image pickup apparatus is powered ON, the driving control unit 307, in order to decide camerawork including objects outside a current capturing range, controls the lens barrel rotation driving unit 306, the lens driving unit 305, and the object information detection unit 309 to execute search processing to search surroundings of the image pickup apparatus. Detected object information is stored in the recording unit 304.

Subsequently, in step S302, the camerawork determination unit 308 executes camerawork determination processing to decide camerawork to be automatically given among camerawork candidates based on the object information stored in the recording unit 304. In step S303, after the camerawork to be given is decided, the driving control unit 307 determines whether it is timing to start capturing the moving images. If the driving control unit 307 determines that it is not timing to start capturing (No in step S303), the processing ends. In step S304, on the other hand, if determining that it is timing to start capturing (Yes in step S303), the driving control unit 307 performs control to capture the moving images while controlling at least one of the lens barrel rotation driving unit 306 and the lens driving unit 305 so that the decided camerawork is given. The processing in steps S301 to S303 are repeated periodically. When a capturing operation is not performed, the processing in steps S301 to S303 is repeated with a period of about 1/30 seconds. Each processing in FIG. 3 will be described in detail below.

Figure 4:
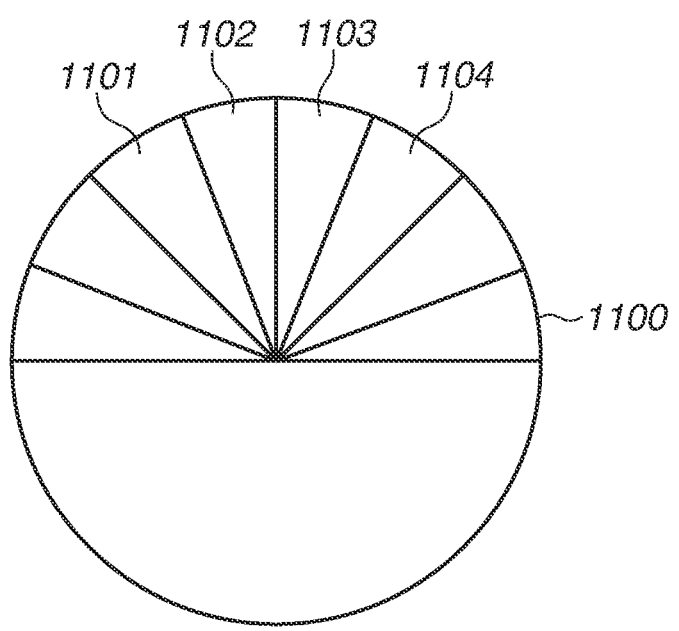
FIG. 4 is a diagram for illustrating a search operation according to the present exemplary embodiment.

The overview of processing executed in a search operation described in step S301 of FIG. 3 will be described with reference to FIG. 4. In the search operation, a capturing possible area (1100) in the pan direction is divided into areas at regular intervals as illustrated in FIG. 4. FIG. 4 illustrates the example in which a field of view is 180 degrees with panning. This is referred to as evaluation areas (1101 to 1104). An area evaluation value in accordance with the object information detected by the object information detection unit 309 is updated and stored for each evaluation area. The area evaluation value is a value for evaluating whether a corresponding area serves as a capturing target, and the value dynamically increases or decreases depending on the situation. The area evaluation value increases when the object is detected in the corresponding evaluation area. The area evaluation value decreases with time and every time the corresponding area is captured. The driving control unit 307 executes the search by thoroughly scanning a movable range in the pan direction and the tilt direction to cover the capturing possible area completely.

While the example of dividing the capturing possible area at regular intervals as the method of dividing the capturing area has been described in the present exemplary embodiment, the method of dividing the capturing area is not limited thereto. For example, the capturing possible area may be divided by varying intervals in accordance with a criterion of some sort such as the number of objects in the surroundings and positional information of an obstacle. Alternative methods that may be employed include a method of dynamically changing intervals of dividing the capturing possible area, a method of dividing the capturing possible area in the tilt direction, and a method of dividing the plane of a sphere two-dimensionally in the pan direction and the tilt direction.

While the method of increasing the area evaluation value based on the detection of the object and decreasing the area evaluation value based on the capturing and the elapse of time has been described, the method of increasing and decreasing the area evaluation value is not limited thereto. A method that may be employed is, for example, to increase or decrease the area evaluation value of an area where a specific object is present based on information for uniquely identifying the object. An alternative method that may be employed is to store unique identification information of the object in each evaluation area, recheck the presence of the target object at the time of executing the search next time or later, and decrease the area evaluation value when it is determined that the object is not present any more. In addition to the above, a still alternative method that may be employed is to change an increased/decreased value based on a priority level of capturing of the object that has been set in advance.

The means of searching the object in the surroundings of the image pickup apparatus further includes a means of determining the number of persons in the surrounds of the image apparatus. The determination means stores the number of persons recognized from the start of the search until the end of the search in the recording unit 304. The determination of the number of persons is executed every time the search is executed and the number is updated.

Figure 5:
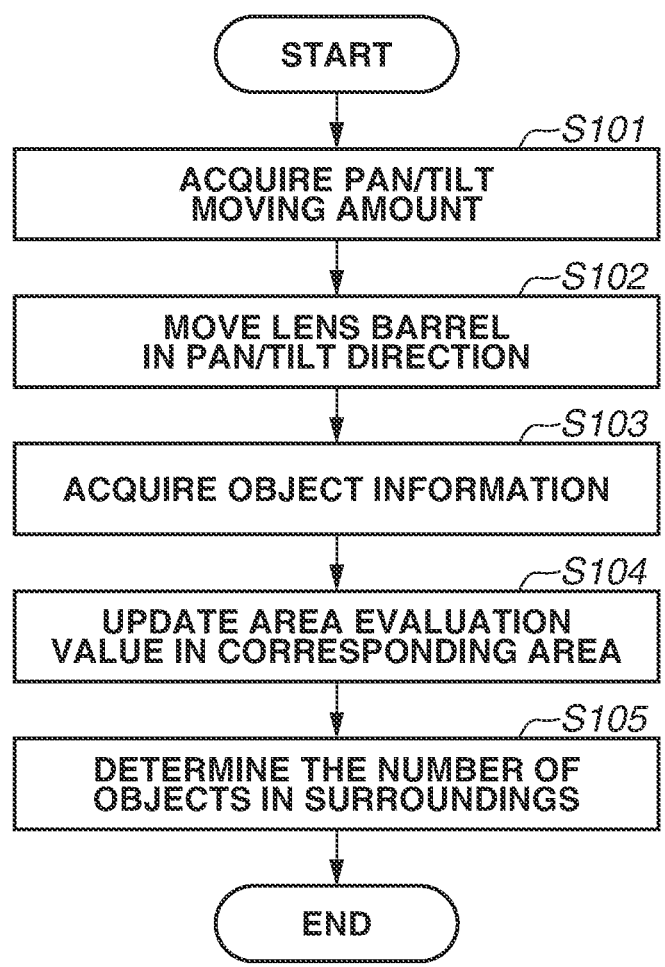
FIG. 5 is a flowchart for illustrating the search operation according to the present exemplary embodiment.

FIG. 5 is a flowchart illustrating processing of the search operation.

As described above, the search operation is processing to preliminarily capture the surroundings of the image pickup apparatus, detect the object from image data acquired by the preliminary capturing, extract object information, and store the object information in the recording unit 304. The preliminary capturing in the present specification refers to capturing for periodically acquiring image data to determine capturing timing, a capturing direction, a zoom position, and a focus position to automatically perform actual capturing, and is differentiated from the actual capturing of the moving images recorded in the recording unit 304. In other words, the preliminary capturing corresponds to live view capturing by a typical digital camera that performs capturing by the user adjusting a composition and performing a shutter operation, and the image data acquired here corresponds to image data for live view display. The image data in the present exemplary embodiment is used by the control box 104 to make a variety of determination for automatic capturing and an image itself is not displayed.

In the search operation, the driving control unit 307 drives the lens barrel 101 in the pan direction and the tilt direction, and searches for the object by preliminarily capturing the widest possible range. In step S101, after starting the search operation, the driving control unit 307 first acquires a pan/tilt moving amount. The driving control unit 307 acquires the pan/tilt moving amount for preliminarily capturing each of the evaluation areas (1101 to 1104). Subsequently, in step S102, the driving control unit 307 moves the lens barrel 101 in the pan direction and the tilt direction based on the acquired moving amount. In step S103, the driving control unit 307 performs control to preliminarily capture each evaluation area, and causes the object information detection unit 309 to detect the object based on the acquired image data to acquire the object information. In step S104, after acquiring the object information, the driving control unit 307 acquires the area evaluation value of each evaluation area based on the acquired object information. In step S105, the driving control unit 307 determines the number of persons detected in step S103 in the capturing possible range of the image-pickup apparatus, and stores the number of persons in the recording unit 304.

Figure 6:
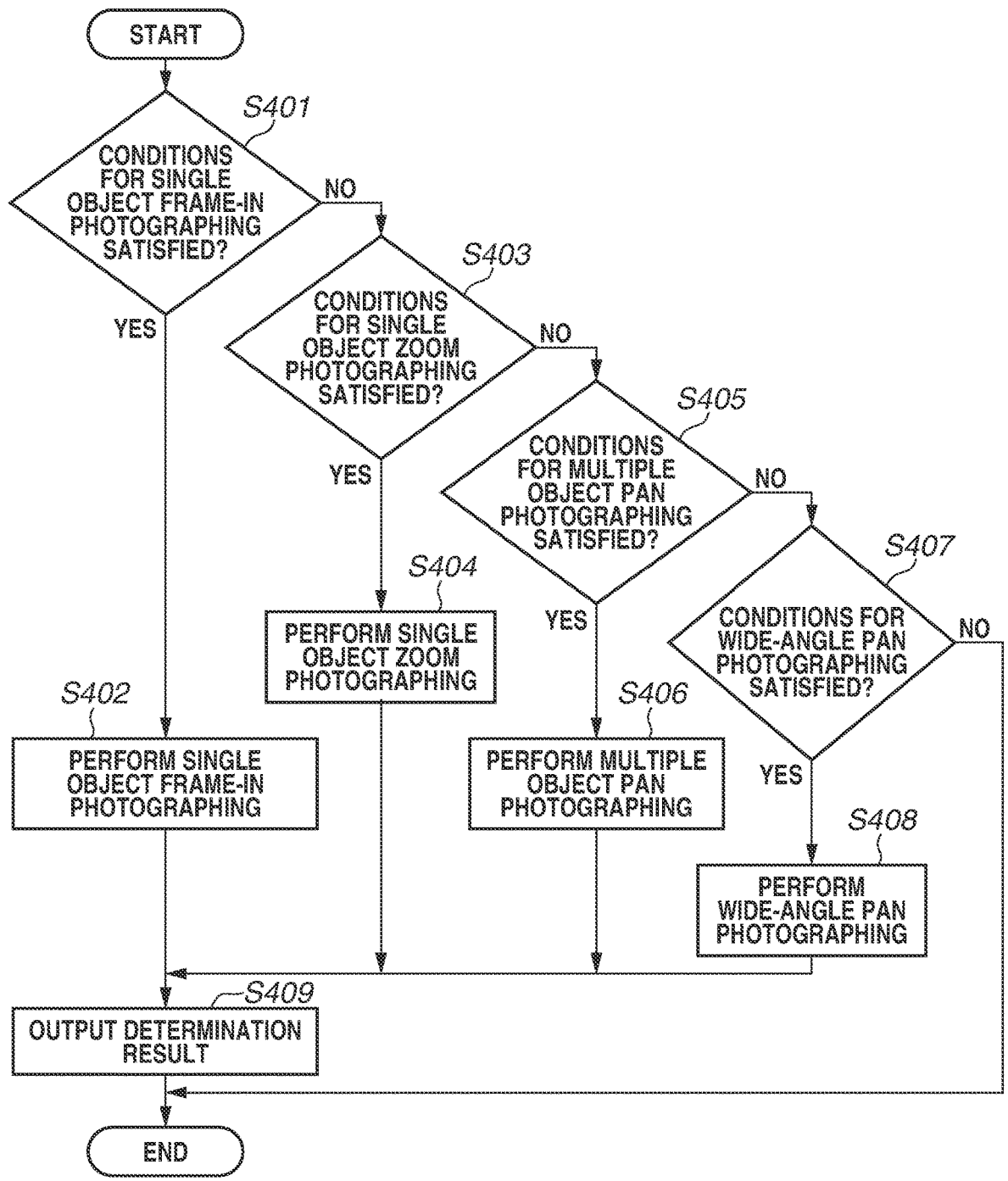
FIG. 6 is a flowchart for illustrating camerawork determination processing according to the present exemplary embodiment.

Subsequently, the camerawork determination processing by the camerawork determination unit 308 will be described. The image pickup apparatus executes the camerawork determination after completing the search operation, and decides camerawork to be given among a plurality of camerawork candidates based on the object information acquired at the time of the search operation. In the present exemplary embodiment, a description will be given of an example of deciding camerawork to be given by using past capturing information, an object identification result, face size information, face orientation information, and a relationship between an object position and a pan/tilt movable range as the object information. FIG. 6 is a flowchart for illustrating camerawork determination processing according to the present exemplary embodiment. The camerawork determination processing executed by the camerawork determination unit 308 will be described below with reference to FIG. 6. The camerawork determination processing is processing executed repeatedly in a state where capturing of moving images is not performed.

In step S401, the camerawork determination unit 308 first determines whether conditions for "single object frame-in capturing", which is pan-in capturing, are satisfied. In step S402, if the conditions are satisfied (Yes in step S401), the camerawork determination unit 308 sets a camerawork determination result as the "single object frame-in capturing". The pan-in capturing is camerawork in which the object is framed-in by pan-driving the lens barrel 101 (panning the image pickup apparatus). The conditions for the "single object frame-in capturing" in step S401 will be described below. In the present exemplary embodiment, the following six conditions are used as the conditions for the "single object frame-in capturing". First, a type of camerawork of moving images captured in the past is acquired from the recording unit 304 and the "single object frame-in capturing" is not included in capturing of the last five times. Furthermore, the number of objects detected from the latest image data that has been acquired up to the time point at which the present processing is executed is single (i.e., one). The detected object is a registered object. The face size is equal to or more than a predetermined value. The face orientation is a transverse orientation. A range from a capturing start position to a capturing end position, which will be described below, falls in a movable range of the pan rotation unit 103. The six conditions describe above are the conditions for the "single object frame-in capturing".

In the present exemplary embodiment, if the size of the detected face in a longitudinal direction is equal to or more than 30% of the image size, the camerawork determination unit 308 determines that the face size is equal to or more than the predetermined value. When the detected face is facing the right at an angle of more than 45 degrees and equal to or less than 90 degrees, or faces the left at an angle of more than 45 degrees and equal to or less than 90 degrees, the camerawork determination unit 308 determines that the face orientation is the transverse orientation. The camerawork determination unit 308 may determine whether the object is a single object using the number of objects acquired in step S105, instead of using the number of objects detected from the latest image data.

In step S403, if the conditions for the "single object frame-in capturing" are not satisfied (No in step S401), the camerawork determination unit 308 determines whether conditions for "single object zoom capturing" are satisfied. In step S404, if the conditions are satisfied (Yes in step S403), the camerawork determination unit 308 sets a camerawork determination result as the "single object zoom capturing". In the present exemplary embodiment, the following five conditions are used as the conditions for the "single object zoom capturing". First, a type of camerawork of moving images captured in the past is acquired from the recording unit 304 and the "single object zoom capturing" is not included in capturing of the last five times. The number of objects detected from the latest image data that has been acquired up to the time point at which the present processing is executed is single (i.e., one). The detected object is a registered object. The face is facing the front side. The face size is equal to or less than the predetermined value or equal to or more than the predetermined value. The five conditions describe above are the conditions for the "single object zoom capturing".

In the present exemplary embodiment, when the detected face is facing the right at an angle of equal to or less than 45 degrees or facing the left at an angle of equal to or less than 45 degrees, the camerawork determination unit 308 determines that the face is facing the front side. In the present exemplary embodiment, the camerawork determination unit 308 determines that the face size is equal to or less than the predetermined value when a size in the longitudinal direction of the detected face is equal to or less than 15% of the image size, and determines that the face size is equal to or more than the predetermined value when the size in the longitudinal direction of the detected face is equal to or more than 25%. When the face size is equal to or less than the predetermined value, camerawork to cause the image pickup apparatus to zoom in is given. When the face size is equal to or more than the predetermined value, camerawork to cause the image pickup apparatus to zoom out is given.

In step S405, if the conditions for the "signal object zoom capturing" are not satisfied (No in step S403), the camerawork determination unit 308 determines that conditions for "multiple object pan capturing" are satisfied, which is camerawork to perform pan-capturing completely covering a plurality of objects. In step S406, if the conditions are satisfied (Yes in step S405), the camerawork determination unit 308 sets a camerawork determination result as the "multiple object pan capturing". In the present exemplary embodiment, the following three conditions are used as the conditions for the "multiple object pan capturing". First, a type of camerawork of moving images captured in the past is acquired from the recording unit 304 and the "multiple object pan capturing" is not included in capturing of the last five times. There are four or more consecutive areas each having an area evaluation value that is equal to or more than a certain value acquired in step S104. Furthermore, there are three or more persons in the surroundings of the image pickup apparatus acquired in step S105 of the search operation. The three conditions described above are the conditions for the "multiple object pan capturing".

In step S407, if the conditions for the "multiple object pan capturing" are not satisfied (No in step S405), the camerawork determination unit 308 determines whether a condition for "wide-angle pan capturing" is satisfied. In step S408, if the condition is satisfied (Yes in step S407), the camerawork determination unit 308 sets a camerawork determination result as the "wide-angle pan capturing". The present exemplary embodiment employs, as the condition for the wide-angle pan capturing", a condition that a type of camerawork given to moving images captured in the past is acquired from the recording unit 304 and the "wide-angle pan capturing" is not included in capturing of the last five times. If the condition for the "wide-angle pan capturing" is not satisfied (No in step S407), the camerawork determination unit 308 determines that camerawork is not automatically given and outputs no determination result, and then the camerawork determination processing ends.

Finally, in step S409, the camerawork determination unit 308 outputs camerawork determined as described above (in steps S402, S404, S406, and S408) to the driving control unit 307, and the driving control unit 307 acquires a composition change pattern of the corresponding camerawork to start the capturing processing. If the condition for the "wide-angle pan capturing" is not satisfied (No in step S407), i.e., none of the determination conditions for camerawork is satisfied, the camerawork determination unit 308 determines that there is no camerawork determination result and outputs no determination result.

Subsequently, the processing in step S304 will be described in detail below with reference to FIG. 3. As described above, the capturing operation processing is processing to add camerawork determined to be given by the camerawork determination in step S302 and automatically capture the moving images. Thus, the capturing operation to be performed differs depending on an output (i.e., camerawork to be given) in step S302. The capturing operation corresponding to each camerawork will be described.

Figure 7:
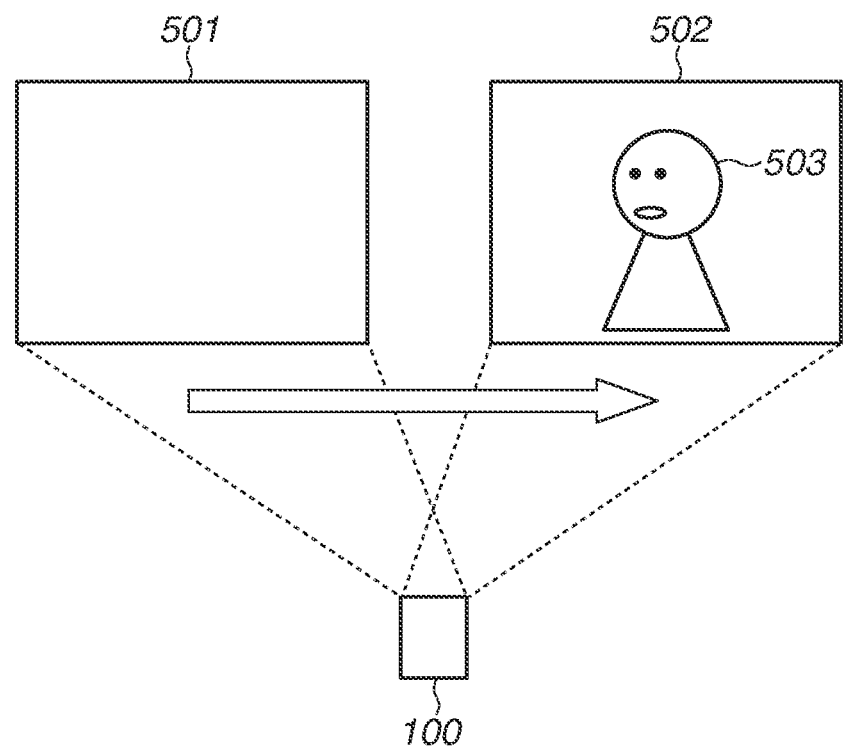
FIG. 7 is a diagram for illustrating single object frame-in capturing according to the present exemplary embodiment.
Figure 8:
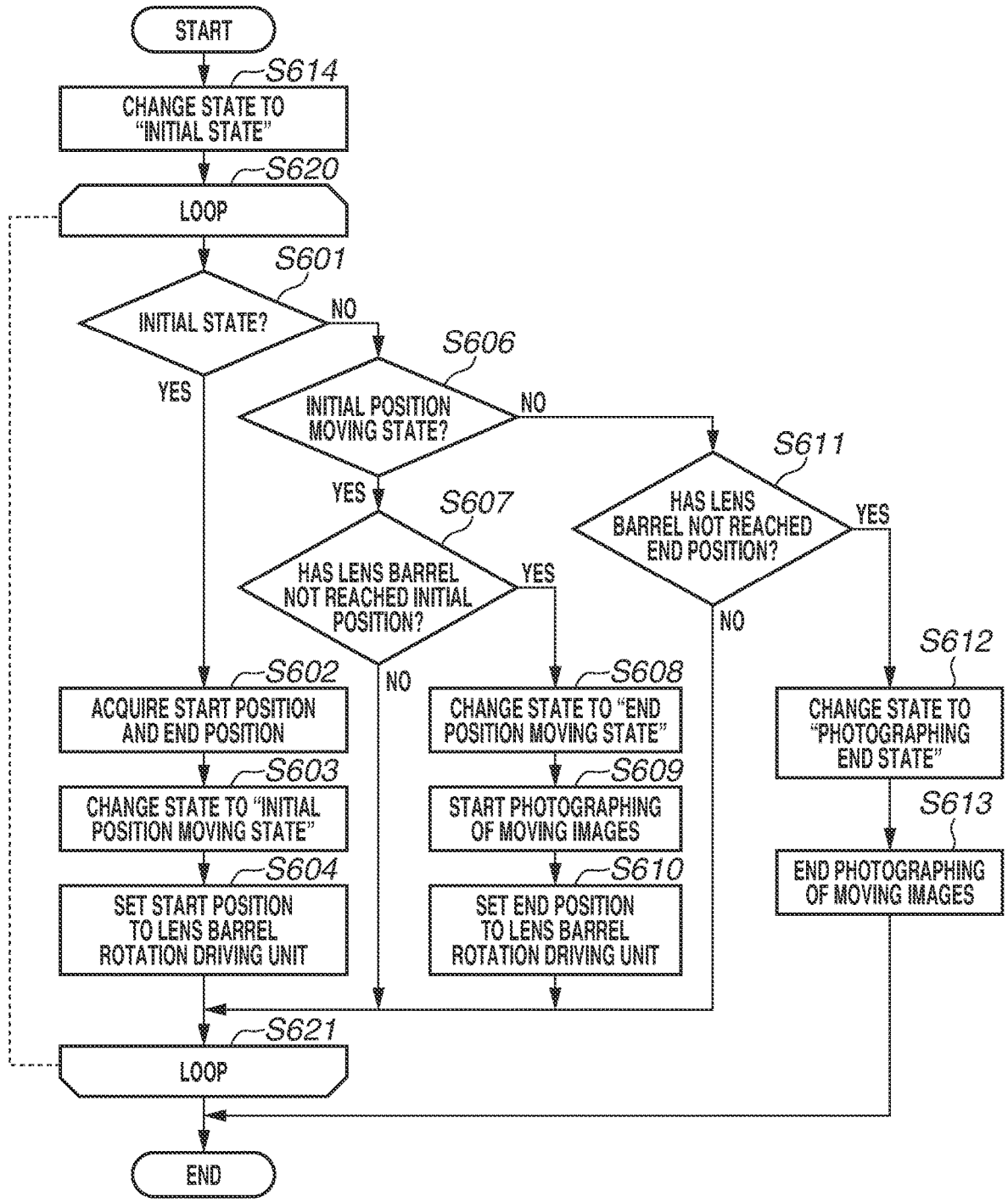
FIG. 8 is a flowchart for illustrating processing of the single object frame-in capturing according to the present exemplary embodiment.

FIG. 7 is a diagram illustrating the single object frame-in capturing according to the present exemplary embodiment. FIG. 8 is a flowchart for illustrating capturing operation processing of the single object frame-in capturing. The single object frame-in capturing will be described with reference to FIGS. 7 and 8. The single object frame-in capturing is performed when the camerawork determination unit 308 determines the single object frame-in capturing. As illustrated in FIG. 7, the single object frame-in capturing is a capturing operation, with respect to an object 503, which is a single object and is facing the transverse direction, to start the capturing from an area in which an image of the object 503 is not captured and change a capturing direction with time by pan-driving the lens barrel 101 to finally bring the object 503 within the capturing range. FIG. 7 illustrates an initial frame 501 and final frame 502 of the moving images.

The flow of the single object frame-in capturing will be described with reference to FIG. 8. First, in step S614, when the single object frame-in capturing starts, the driving control unit 307 changes the state to an initial state. In processing thereafter, the processing within a loop (from steps S620 to S621) is repeated until the single object frame-in capturing ends. The processing within the loop will be described below. In step S601, the driving control unit 307 first determines whether the current state is the initial state. In step S602, if the current state is the initial state (YES in step S601), the driving control unit 307 acquires the capturing start position (position at which frame 501 is captured) and the capturing end position (position at which frame 502 is captured) based on the positional information of the object 503 acquired from the object information detection unit 309. Subsequently, in step S603, the driving control unit 307 changes the state to an initial position moving state. The driving control unit 307 acquires the capturing start position based on the face orientation of the object 503. The capturing start position is advanced to an angle of 50 degrees in the direction of the face orientation of the object from an angle of the pan rotation unit 103 at the capturing end position (position at which frame 502 is captured). The capturing end position is at an angle of the pan rotation unit 103 when the capturing end position is acquired (in step S602). After that, in step S604, the driving control unit 307 sets the capturing start position and the driving velocity to the lens barrel rotation driving unit 306. In the present exemplary embodiment, a predetermined fixed value is used for the driving velocity.

In step S606, if it is determined that the state is not the initial state (No in step S606), the driving control unit 307 determines whether the state is the initial position moving state. In step S607, if the state is the initial position moving state (Yes in step S606), the driving control unit 307 determines whether the lens barrel has not reached the capturing start position. If it is determined that the lens barrel has not reached the capturing start position (No in step S607), the driving control unit 307 executes the loop (from step S620 to step S621) from the beginning. In contrast, in step S608, if it is determined that the state is the initial position moving state (Yes in step S606) and the lens barrel has reached the capturing start position (Yes in step S607), the driving control unit 307 changes the state to an end position moving state. In step S609, the driving control unit 307 performs control to start capturing the moving images. In step S610, after the start of the capturing, i.e., during the capturing, the driving control unit 307 sets the capturing end position 502 and the driving velocity to the lens barrel rotation driving unit 306. A predetermined fixed value is used for the driving velocity. However, a moving velocity to the capturing start position and a moving velocity to the capturing end position may take different values.

In step S606, if it is determined that the state is not the initial state (No in step S606), the state is the end position moving state. In step S611, if the state is the end position moving state, the driving control unit 307 determines whether the lens barrel has not reached the capturing end position. If the lens barrel has not reached the capturing end position (No in step S611), the driving control unit 307 executes the loop (from steps S620 to S621) from the beginning. In step S612, if it is determined that the state is the end position moving state and the lens barrel has reached the capturing start position (Yes in step S611), the driving control unit 307 changes the state to a capturing end state. In step S613, the driving control unit 307 performs control to end capturing of the moving images.

As the method of calculating a composition change pattern in the single object frame-in capturing in the present exemplary embodiment, the description has been given of the method of setting the capturing end position to an angle of the pan rotation unit 103 at the time of the processing in step S602, and setting the capturing start position to an angle of 50 degrees advanced in the direction of the face orientation of the object from the angle of the pan rotation unit 103. However, the method of acquiring the capturing start position and the capturing end position in accordance with the composition change pattern is not limited thereto. For example, there is a method of selecting a start angle at the capturing start position in accordance with a position and size of the object. Furthermore, a method that may be employed, for example, that calculates an end angle with respect to the capturing end position in accordance with a center composition to bring the position of the object at the center of the angle of view or the rule of thirds to arrange the position of the object on boundary lines that divide the angle of view equally among three.

FIG. 15 is a diagram for illustrating a relationship between a zoom position zp and a relative angle of view aov(zp) according to the present exemplary embodiment of the disclosure.

In the present exemplary embodiment, the zoom position zp can be set from 0 to 100. This means that the smaller the value, the closer the zoom position to a wide-angle end, while the larger the value, the closer the zoom position to a telephoto end. That is, the zoom position zp=0 is the wide-angle end, while the zoom position zp=100 is the telephoto end. The capturable angle of view changes in accordance with the zoom position zp. The closer the zoom position zp to the wide-angle end, the larger a capturing angle of view. The closer the zoom position zp to the telephoto end, the smaller the capturing angle of view. The relative angle of view aov(zp) illustrated in FIG. 15 is a numeric value indicating the relative angle of view at each zoom position zp assuming that the capturing angle of view is 1000 when the zoom position zp is zero.

For example, the relative angle of view aov (100) is 500 when the zoom position zp is 100, which indicates that the capturing angle of view is 50% when the zoom position zp is 100 compared with the capturing angle of view when the zoom position zp is zero.

Figure 9:
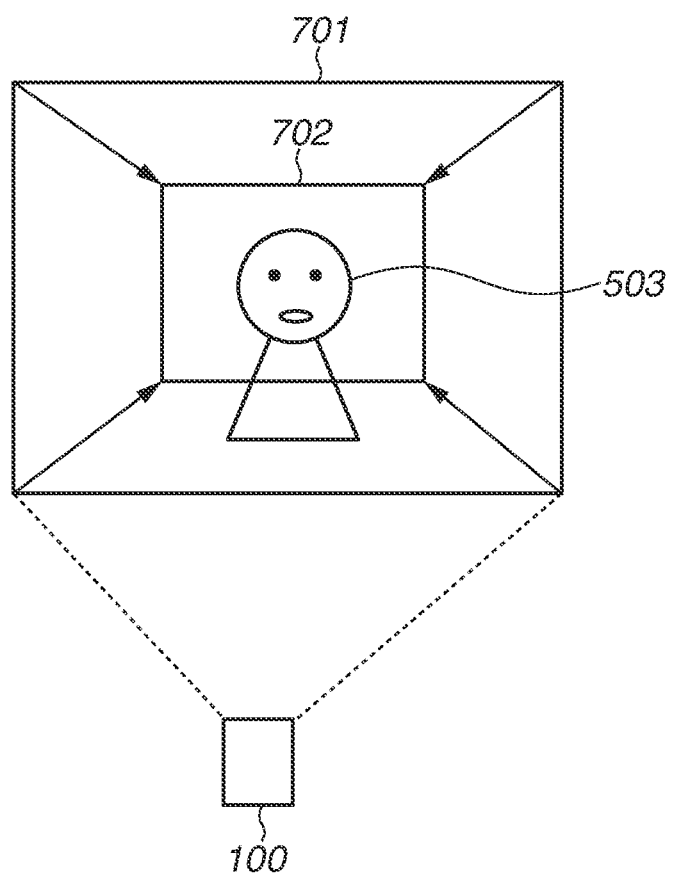
FIG. 9 is a diagram for illustrating single object zoom capturing according to the present exemplary embodiment.
Figure 10:
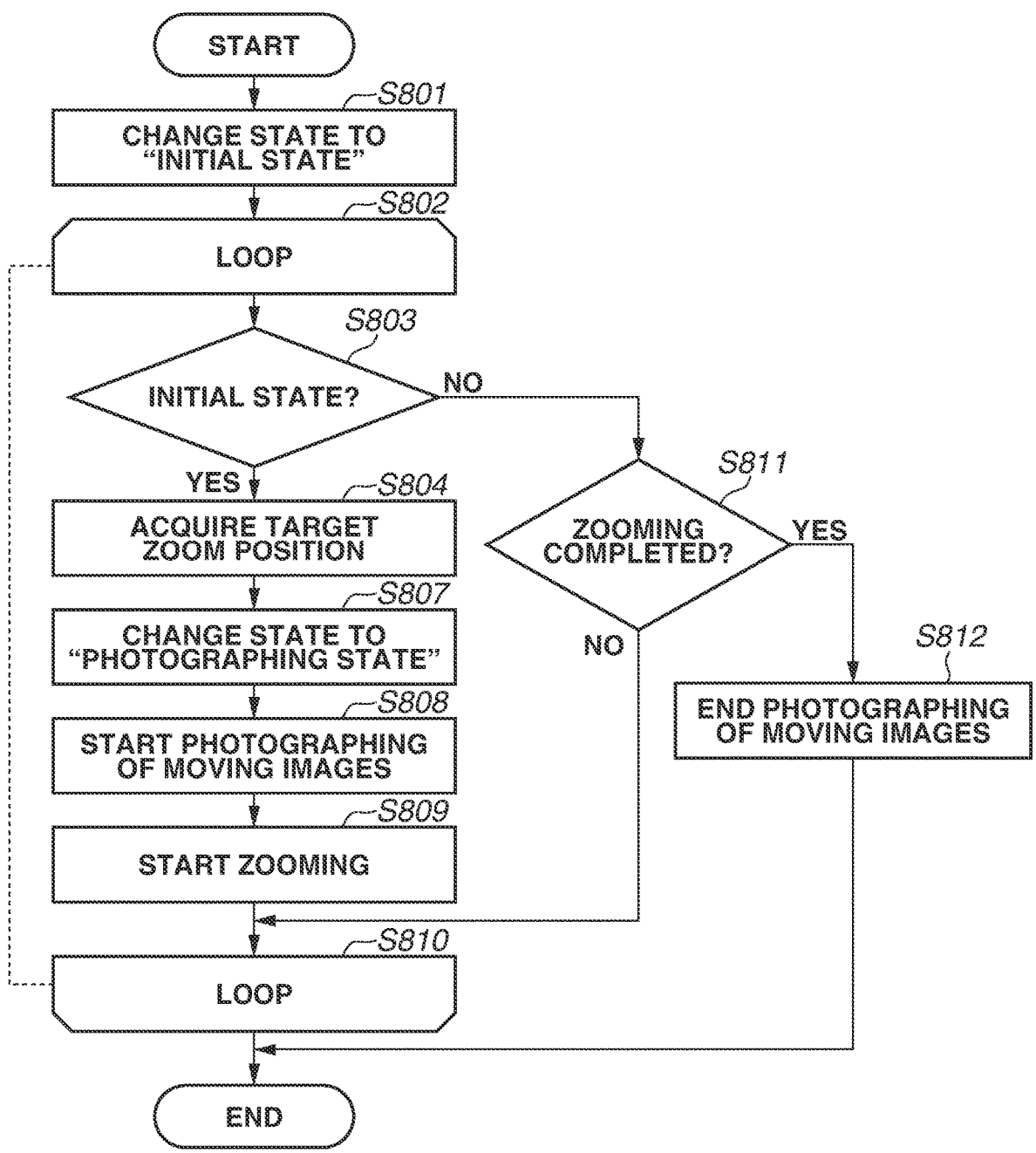
FIG. 10 is a flowchart for illustrating processing of the single object zoom capturing according to the present exemplary embodiment.

FIG. 9 is a diagram for illustrating the single object zoom capturing according to the present exemplary embodiment. FIG. 10 is a flowchart for illustrating capturing operation processing of the single object zoom capturing according to the present exemplary embodiment. The single object zoom capturing will be described with reference to FIGS. 9 and 10. The single object zoom capturing is performed when the camerawork determination unit 308 determines the single object zoom capturing. As illustrated in FIG. 9, the single object zoom capturing is capturing to zoom in or out on the detected single object 503 by taking a predetermined amount of time. FIG. 9 illustrates an example of zoom-in, in which camerawork is given to moving images by zooming in on the object 503 from an initial frame 701 of the moving images to a final frame 702 of the moving images by taking a predetermined amount of time.

The flow of the single object zoom capturing will be described with reference to FIG. 10. In step S801, when the single object zoom capturing starts, the driving control unit 307 first changes the state to the initial state. In processing after that, the processing within a loop (from steps S802 to S810) is repeated until the single object zoom capturing ends. The processing within the loop will be described below. In step S803, the driving control unit 307 determines whether the current state is the initial state. In step S804, if the current state is the initial state (Yes in step S803), the driving control unit 307 acquires a target zoom position (position at which frame 702 is captured). The target zoom position is 100 in the case of zooming-in, and zero in the case of zooming-out.

The zoom position when the target zoom position is acquired (in step S802) is used as it is as the capturing start position (position at which frame 701 is captured). Subsequently, in step S807, the driving control unit 307 changes the state to a capturing state. In step S808, the driving control unit 307 performs control to start capturing the moving images. In step S809, the driving control unit 307 sets the target zoom position to the lens driving unit 305 to start zooming.

In step S811, if it is determined that the state is not the initial state (No in step S803), the driving control unit 307 determines whether the zoom position has reached the target zoom position, i.e., the zoom operation has been completed. In step S812, if the zoom operation has been completed (Yes in step S811), the driving control unit 307 performs control to end capturing the moving images, and the processing exits from the loop of the single object zoom capturing (from steps S802 to S810).

While the example of setting the fixed value as the method of acquiring the target zoom position has been described in the present exemplary embodiment, the acquisition method is not limited thereto. For example, with respect to the face size of the object, a position at which the face size of the object remains within a predetermined range or a position at which the face size of the object is equal to or less than a predetermined value or equal to or more than the predetermined value may be set as the target zoom position. The target position may be obtained in accordance with capturing time. An alternative method that may be employed is to obtain a position where a predetermined amount of zooming-in or zooming-out is carried out with respect to the capturing start position.

While the description has been given of the example of using the zoom position when the target zoom position is obtained as it is as the capturing start position, the acquisition of the target zoom position is not limited thereto. A method may be employed, for example, that sets, as the target zoom position, a position at which the face size of the object remains within a predetermined range in accordance with the size of the object, or a position at which the face size of the object is equal to or less than a predetermined value or equal to or more than the predetermined value, or sets the target position to a fixed value.

Figure 11:
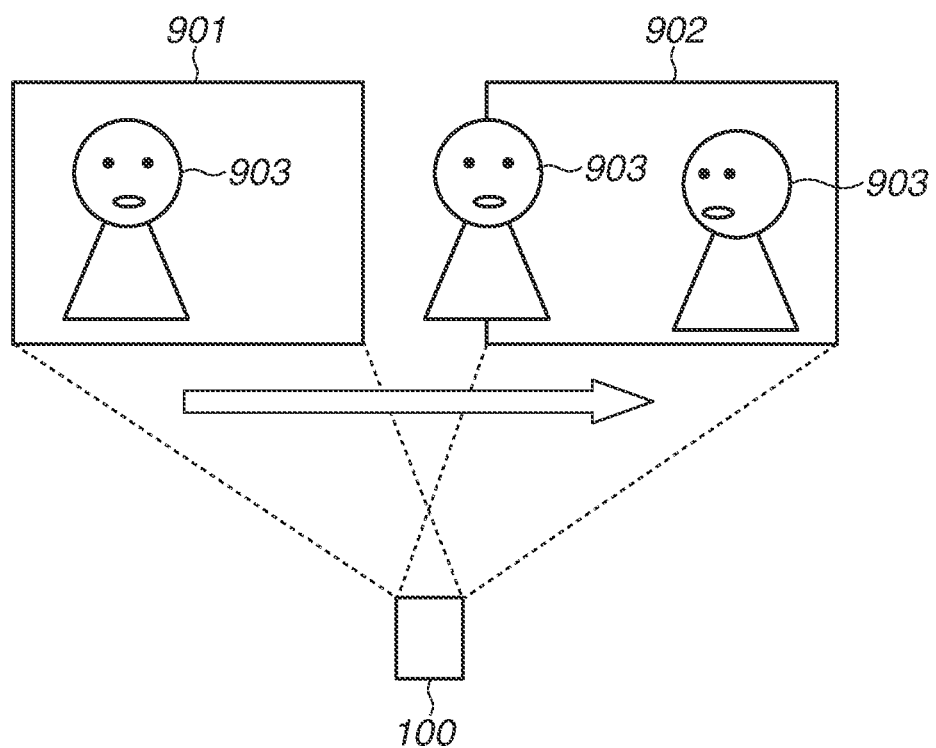
FIG. 11 is a diagram for illustrating multiple object pan capturing according to the present exemplary embodiment.
Figure 12:
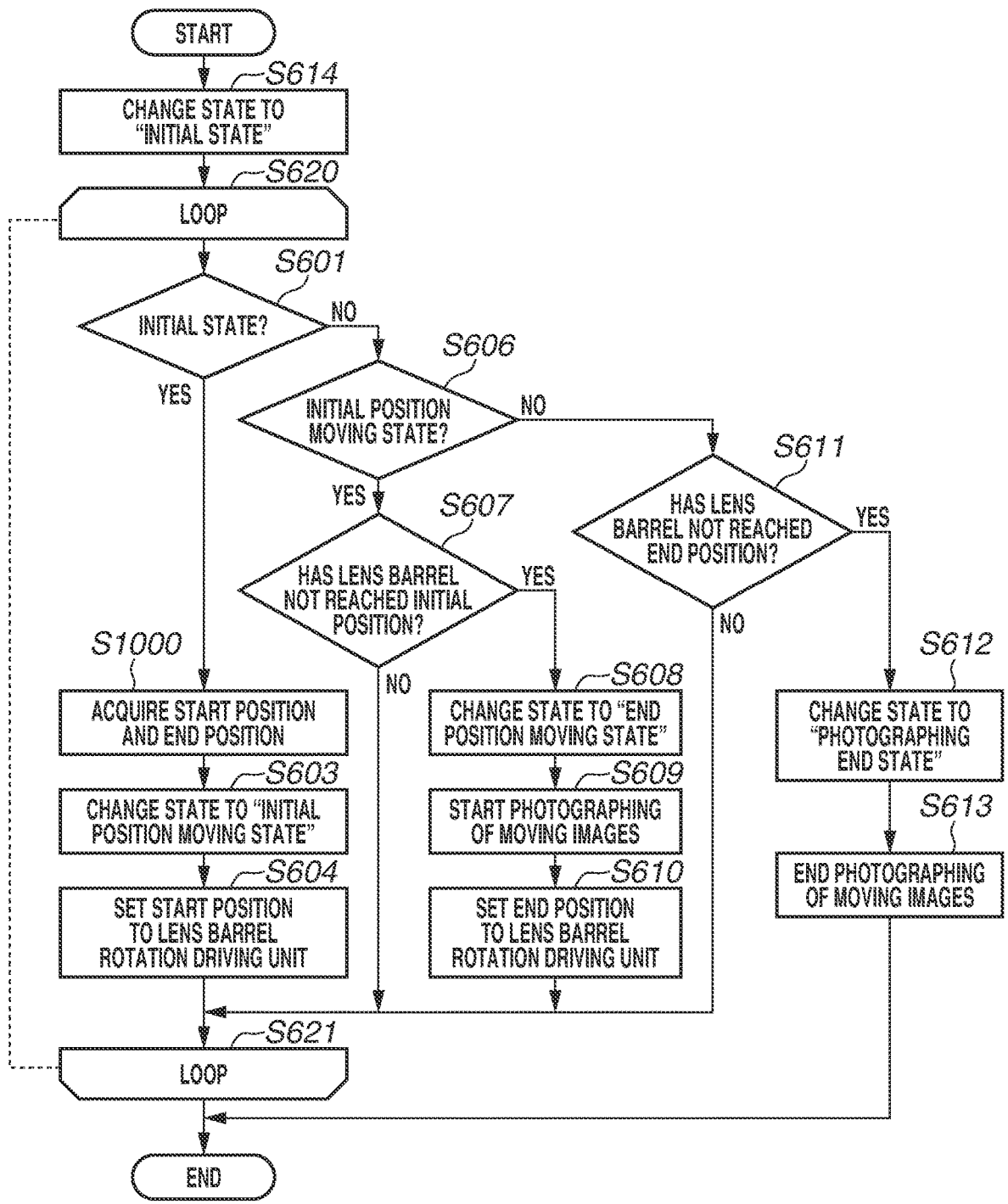
FIG. 12 is a flowchart for illustrating processing of the multiple object pan capturing according to the present exemplary embodiment.

FIG. 11 is a diagram for illustrating multiple object pan capturing according to the present exemplary embodiment. FIG. 12 is a flowchart for illustrating capturing operation processing of the multiple object pan capturing. The multiple object pan capturing will be described with reference to FIGS. 11 and 12. The multiple object pan capturing is performed when the camerawork determination unit 308 determines the multiple object pan capturing. As illustrated in FIG. 12, in a case where a plurality of objects 903 is distributed over a range wider than an image pickup area, the multiple object pan capturing is carried out while changing a capturing composition by changing a capturing direction so as to completely cover the plurality of objects based on the object information acquired from the recording unit 304.

Since the processing of the multiple object pan capturing (illustrated in FIG. 12) has a lot of similarities to the processing of the single object frame-in capturing (illustrated in FIG. 8), common elements are denoted by the same reference signs, description thereof will be omitted, and only differences will be described. In step S614, when the capturing starts, the driving control unit 307 changes the state to the initial state, and executes the processing in the loop (from steps S620 to S621) until the capturing ends, which is similar to the single object frame-in capturing. In step S1000, if it is determined that the state is the initial state in the case of the multiple object pan capturing (Yes in step S601), the driving control unit 307 acquires a capturing start position 901 and a capturing end position 902.

The camerawork determination unit 308 determines that the capturing is the multiple object pan capturing on the condition that there are four or more consecutive evaluation areas each having an area evaluation value that is equal to or more than a threshold. The camerawork determination unit 308 determines that conditions for the multiple object pan capturing are satisfied and sets the evaluation areas 1101 to 1104 as the capturing area, for example, when the evaluation areas 1101 to 1104 each have an evaluation value that is equal to or more than the threshold, or when the evaluation areas 1101 and 1104 have an evaluation value that is equal to or more than the threshold but the evaluation areas 1102 and 1103 each have an evaluation value that is equal to or less than the threshold. In contrast, the camerawork determination unit 308 determines that the conditions for the multiple object pan capturing are not satisfied, for example, when the evaluation areas 1101 and 1104 have an evaluation value that is equal to or less than the threshold even if the evaluation areas 1102 and 1103 have an value that is equal to or more than the threshold.

The capturing start position 901 and the capturing end position 902 are values represented by angles at the center of an image pickup plane in the pan direction at the time of the start of the capturing and the end of the capturing, respectively. The driving control unit 307 acquires the capturing start position 901 and the capturing end position S902 based on the capturing area decided as described above. In the present exemplary embodiment, the driving control unit 307 calculates the capturing start position 901 and the capturing end position 902 as angles of boundary lines, each of which is between an outermost evaluation area and an evaluation area immediately interior of the outermost evaluation area. That is, when the capturing area is the evaluation areas 1101 to 1104, the capturing start position 901 is represented by an angle in the pan direction when a boundary line between the evaluation area 1101 and the evaluation area 1102 are coincident with the center of the image pickup plane. The capturing end position 902 is represented by an angle in the pan direction when a boundary line between the evaluation area 1104 and the evaluation area 1103 are coincident with the center of the image pickup plane.

While the example of using the angle of the border line between the outermost evaluation area and the evaluation area immediately interior of the outermost evaluation area in the capturing area has been described as the example of the method of acquiring the capturing start position 901 and the capturing end position 902 in the present exemplary embodiment, the acquisition method is not limited thereto. Examples of methods that may be employed include changing the acquisition method in accordance with an angle of an evaluation area or an angle of view of the image pickup apparatus or dynamically acquiring the capturing start position 901 and the capturing end position 902 in accordance with a zoom magnification.

While the example of deciding the capturing area based on a search result has been described as the method of deciding the capturing area in the present exemplary embodiment, the method of deciding the capturing area is not limited thereto. A method may be employed, for example, that decides the object as a capturing target in the surroundings of the image pickup apparatus and after that sets an area that contains all the objects as the capturing area.

Furthermore, the capturing start position 901 and the capturing end position 902 can be replaced with each other. Using the above example for explanation, when the capturing area is the evaluation areas 1101 to 1104, the capturing start position 901 may be represented by an angle of a boundary line between the evaluation area 1104 and the evaluation area 1103, and the capturing end position 902 may be represented by an angle of a boundary line between the evaluation area 1101 and the evaluation area 1102. That is, a direction of the pan operation may be either direction. Examples of methods of deciding the pan direction include always using one direction, replacing directions every time the capturing is performed, selecting a direction using random numbers, deciding a direction in accordance with a priority level of the object, and deciding a direction in accordance with the orientation of the object.

Figure 13:
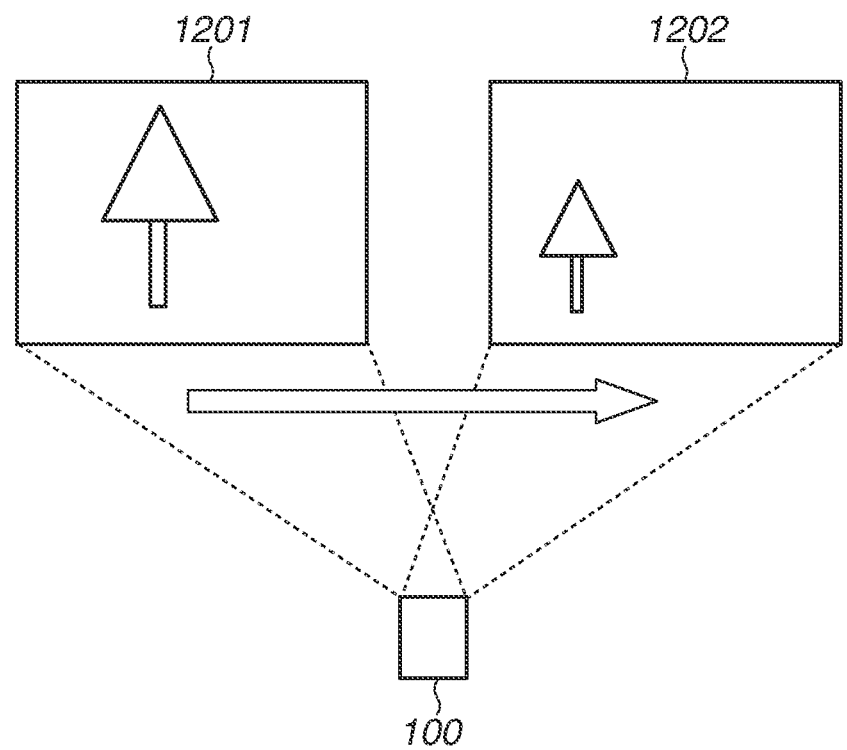
FIG. 13 is a diagram for illustrating wide-angle pan capturing according to the present exemplary embodiment.

FIG. 13 is a diagram for illustrating wide-angle pan capturing according to the present exemplary embodiment.

Figure 14:
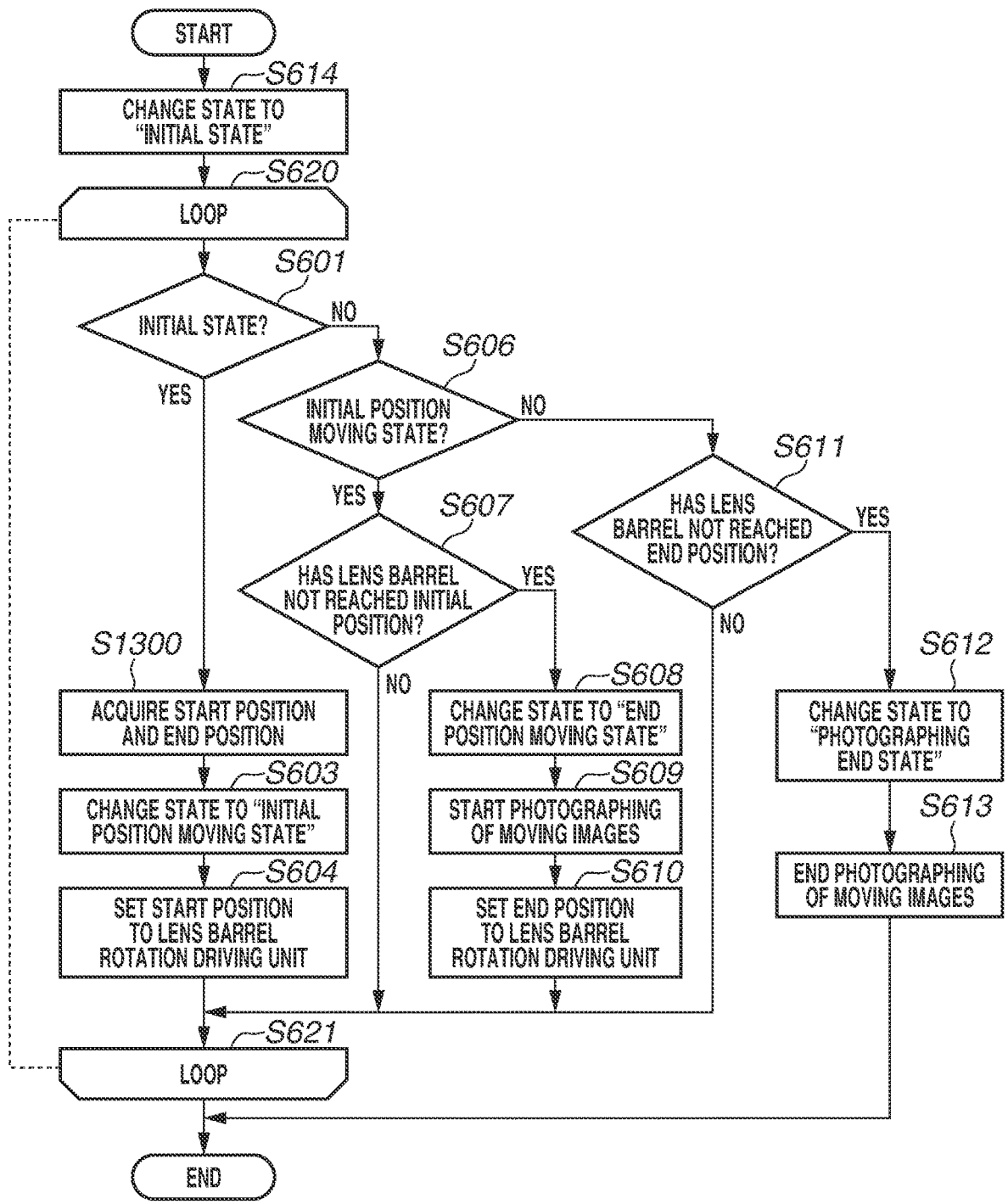
FIG. 14 is a flowchart for illustrating processing of the wide-angle pan capturing according to the present exemplary embodiment.

FIG. 14 is a flowchart for illustrating capturing operation processing of the wide-angle pan capturing. The wide-angle pan capturing will be described with reference to FIGS. 13 and 14.

The wide-angle pan capturing is performed when the camerawork determination unit 308 determines the wide-angle pan capturing. The wide-angle pan capturing is capturing of a specific area regardless of the presence/absence of the object by driving the lens barrel 101 to rotate in the pan direction. FIG. 13 illustrates an initial frame 1201 and final frame 1202 of the moving images. Since the processing of the wide-angle pan capturing (illustrated in FIG. 14) has a lot of similarities to the processing of the single object frame-in capturing (illustrated in FIG. 8), common elements are denoted by the same reference signs, description thereof will be omitted, and only differences will be described.

In step S614, when the capturing starts, the driving control unit 307 changes the state to the initial state, and executes the loop (from steps S620 to S621) until the capturing ends, which is similar to the single object frame-in capturing. In step S1300 in the case of wide-angle pan capturing, if it is determined that the state is the initial state (Yes in step S601), the driving control unit 307 acquires the capturing start position (position at which frame 1201 is captured) and the capturing end position (position at which frame 1202 is captured). The capturing start position and the capturing end position are represented by respective angles in the pan direction.

In the present exemplary embodiment, the capturing range at the time of the wide-angle pan capturing is set to an angle of 180 degrees on the front side of the image pickup apparatus, and one end of the capturing range closer to a pan angle at the time of acquiring the capturing start position and the capturing end position is set as the capturing start position and the other end thereof is set as the capturing end position. A frame acquired at the capturing start position is the frame 1201, while a frame acquired at the capturing end position is the frame 1202.

While the example of setting the capturing range in the angle of 180 degrees on the front side of the image pickup apparatus has been described in the present exemplary embodiment, a method of deciding the capturing range is not limited thereto. Examples of methods that may be employed include calculating of the capturing range using the position of the object detected by the object information detection unit 309, or using luminance distribution in the surroundings of the image pickup apparatus.

(Modifications)

While the exemplary embodiment of the disclosure has been described, the disclosure is not limited to the exemplary embodiment, and various modifications and changes can be made without departing from the gist of the disclosure.

For example, repeated execution of the determination processing in the state where the moving image capturing is not performed has been described as the method of determining camerawork in the exemplary embodiment described above, but the determination method is not limited thereto. For example, conceivable methods are executing the determination processing intermittently, and not executing the determination processing during preparation for the capturing such as during the search operation of the surrounding situation, during a tracking operation of the object, during the zoom operation, and an operation immediately after the capturing. The determination processing may be executed in combination with simple still image capturing or moving image capturing.

Candidates for camerawork other than the four candidates in the exemplary embodiment described above that serve as a determination target of the camerawork determination unit 308 may be employed. Furthermore, the number of candidates may be increased. Examples of candidates for camerawork can include 360-degree panoramic capturing in the surroundings, capturing by tilt-in to the object, capturing by tilt-out from the object, capturing by focus-in on the object, and capturing by focus-out from the object. Examples of candidates for camerawork also include composite camerawork in combination with panning, tilting, and zooming, and time-lapse capturing and slow-motion capturing based on motion information of the object.

The following conditions can be employed as capturing conditions for "focus-out capturing". The condition of the "focus-out capturing" is that it is not included in capturing of the last five times. A point light source and the object are present within the angle of view. The object is a registered object. The face size in the longitudinal direction is equal to or more than 30% of the image size. When it is decided that the focus-out capturing is camerawork to be given, the driving control unit 307 acquires the capturing start position and the capturing end position before the start of the capturing, similar to the capturing operation processing for giving the camerawork described above. In the case of the focus-out capturing, values of the capturing start position and capturing end position are fixed with respect to panning, tilting, and zooming, and a focus position is variable. The capturing start position is a position at which the object is put into focus, and the capturing end position is a position at which the object is out of focus, e.g., a position at which a focus is placed on 10 meters short of the object.

Moving a focus with time from the capturing start position to the capturing end position generates blurring. By performing the "focus-out capturing", capturing of moving images having variations including blurring can be carried out. Furthermore, the focus-in capturing can be achieved by replacing the capturing start position and capturing end position of the focus-out capturing with each other.

Since conditions for tilt-in capturing have a lot of similarities to those for the "single object frame-in capturing", only differences will be described. The conditions for the tilt-in capturing include a condition obtained by changing the condition of the "single object frame-in capturing" regarding the face orientation of the object to an upward or downward orientation. When the detected face is facing upward at an angle of more than 45 degrees and equal to or less than 90 degrees, it is determined that the face orientation is the upward orientation. When the detected face is facing downward at an angle of more than 45 degrees and equal to or less than 90 degrees, it is determined that the face orientation is the downward orientation. Further, the condition for the tilt-in capturing is that a range from the capturing start position to the capturing end position is within a movable range of the tilt rotation unit 102, instead of the movable range of the pan rotation unit 103. The capturing end position is a position at which the object is captured at the center of the image pickup range, and the capturing start position is at a position shifted by 50 degrees in the tilt direction in the face orientation of the object from the capturing end position.

Conditions for pan-out capturing are similar to those for the pan-in capturing and conditions for tilt-out capturing are similar to those for the tilt-in capturing. The pan-out capturing can be achieved by replacing the capturing start position and capturing end position of the pan-in capturing with each other. The tilt-out capturing can be achieved by replacing the capturing start position and capturing end position of the tilt-in capturing with each other.

The determination criterion for each camerawork described in the present exemplary embodiment are merely examples and the determination criterion are not limited thereto. Especially, regarding the examples of specific numerical values, different numerical values may be employed.

While not including the same camerawork in the capturing of the last five times has been described as the method of using the past capturing information, the method of using the capturing information in the past is not limited thereto. For example, when the camerawork determination unit 308 determines camerawork to be used, information of the object captured the last time is obtained with certain camerawork from the recording unit 304 and the camerawork is not used when the object being captured is the same, as a condition. Furthermore, a method may be employed, for example, that determines whether to perform capturing even when the object is the same depending on a degree of coincidence of the orientation or size of the face at the time of the capturing of the last time.

Further, an alternative method may be employed that records information regarding a location of the capturing as the past capturing information, and apply the restricting conditions described above (condition of not including the same camerawork in capturing of the last five times and condition of not capturing the object with the same camerawork) only when the location of the capturing is the same. With respect to the determination of the location of the capturing, there is a method of determining whether the location has been changed by detection of a lifted state, by an inertial sensor, in addition to acquisition of positional information by a global positioning system (GPS).

Furthermore, the order of the determination steps of camerawork (steps S401, S403, S405, and S407) may be changed according to a purpose. For example, it is conceivable that the determination steps are arranged in such an order that respective conditions are hard to be satisfied. The method results in variations of camerawork to be given and can achieve capturing of moving images having a wide range of variations. Other than the above methods, a method may be employed that adjusts a frequency by counting the number of times of capturing for each camerawork, or determines the order in advance.

Furthermore, the frequency of capturing with camerawork may be dynamically changed, e.g., changed in accordance with a user's setting or through a learning process (user's preferences are determined from among those selected by user's operation).

In the exemplary embodiment described above, the object information is information regarding the features of the face of the person. However, the object information is not limited thereto, and feature information of an object other than the person such as an animal and a physical object may be used as the object information.

In the exemplary embodiment described above, the description has been given of the example where both the pan-driving and the tilt-driving are possible by rotating the lens barrel 101 including the image pickup unit 302 centering around both the X-axis and the Y-axis. However, even if the lens barrel 101 cannot rotate centering around both the X-axis and the Y-axis, the aspect of the embodiments can be applied if the lens barrel 101 can rotate centering around at least one or more axes. For example, if the lens barrel 101 can rotate centering around the Y-axis, camerawork can be given by utilizing the pan-driving as described above.

In the exemplary embodiment described above, the description has been given of the example of the image pickup apparatus in which the lens barrel including the photographic optical system and the image pickup element, and the image pickup control apparatus that controls the image pickup direction of the lens barrel are integrated. However, the aspect of the embodiments is not limited thereto. For example, the image pickup apparatus may be configured such that a lens is exchangeable.

Furthermore, similar functions can be achieved by fixing the image pickup apparatus on a pan head provided with the rotation mechanism that drives the fixed image pickup apparatus in the pan direction and the tilt direction. The image pickup apparatus includes an image pickup function and may include other functions. By combining a pan head to which a smartphone having the image pickup function can be fixed, with the smartphone, a similar configuration to that of the exemplary embodiment can be realized. Furthermore, the lens barrel, its rotation mechanism (tilt rotation unit and pan rotation unit), and the control box need not be physically connected with one another, and the rotation mechanism and the zoom function may be controlled, for example, via wireless communication such as Wireless Fidelity (Wi-Fi).

The description has been given of the configuration in which the lens unit has the zoom function in the exemplary embodiment described above. However, even when the lens unit not having the zoom function is used, camerawork utilizing the pan-driving, the tilt-driving, and focus control of the lens barrel can be given. A zoom function (electronic zoom) achieved by changing a range in which an image is clipped from image data acquired by the image pickup element may be employed instead of the zoom function (optical zoom) achieved by moving the zoom lens, or both the functions may be used in combination.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-180369, filed Sep. 30, 2019, which is hereby incorporated by reference herein in its entirety.

What is claimed is:

1. A control apparatus comprising a memory containing instructions; and one or more processors to execute the instructions to function as:
   a detection unit configured to acquire image data captured by an image pickup unit for acquiring the image data based on light from a photographic optical system, and detect an object from the image data;
   a capturing control unit configured to output an instruction to start capturing to the image pickup unit without a user operation, to cause the image pickup unit to automatically capture moving images to be recorded;
   a camerawork decision unit configured to decide camerawork to be given during recording the moving images automatically captured by the capturing control unit from among a plurality of types of camerawork having different change patterns of at least one of a composition of recorded moving images and a focus of the photographic optical system based on information indicating a detection result of the object from the detection unit, before the moving images to be recorded are captured; and
   a control unit configured to control at least one of the composition and the focus at a capturing start position based on a decision result from the camerawork decision unit before automatic capturing by the capturing control unit is started and perform control to change at least one of the composition and the focus with a pattern corresponding to the decision result to a capturing end position based on the decision result by the camerawork decision unit during the automatic capturing of the moving images to be recorded.

2. The control apparatus according to claim 1, wherein the control unit is configured to perform control to change the composition by controlling rotation by a rotation mechanism configured to perform at least one of pan-driving or tilt-driving of the image pickup unit by rotating the image pickup unit centering around at least one or more axes.

3. The control apparatus according to claim 2,
   wherein the control unit is configured to control the image pickup unit, the detection unit, and the rotation mechanism so that search processing is carried out to search for the object before start of the automatic capturing of the moving images,
   wherein the control unit includes a memory configured to store object information detected by the search processing, and
   wherein the camerawork decision unit is configured to decide the camerawork to be given to the capturing of the moving images based on the object information stored in the memory.

4. The control apparatus according to claim 3,
   wherein in the search processing,
      the image pickup unit is configured to acquire the image data with a plurality of the compositions, and
      the detection unit is configured to acquire the image data obtained with the plurality of compositions, and detect the object.

5. The control apparatus according to claim 1, wherein the control unit is configured to change the composition by controlling zooming of the image pickup unit.

6. The control apparatus according to claim 1,
   wherein the control unit is configured to:
      control the focus; and
      give the camerawork by performing control to change the focus with a pattern corresponding to the decision result by the camerawork decision unit.

7. The control apparatus according to claim 1,
   wherein the detection unit is configured to detect a face orientation of the object, and
   wherein the camerawork decision unit is configured to decide the camerawork to be given to the moving images automatically captured based on the detected face orientation of the object.

8. The control apparatus according to claim 1,
   wherein the detection unit is configured to execute identification processing of the object by comparing a feature amount of the detected object and a feature amount of an object that has been registered in advance, and
   wherein the camerawork decision unit is configured to decide the camerawork to be given to the moving images automatically captured based on a result of the identification processing.

9. The control apparatus according to claim 8, wherein the identification processing executed by the detection unit is at least one of individual authentication processing and physical object recognition processing.

10. The control apparatus according to claim 8, wherein the camerawork decision unit is configured to decide the camerawork to be given based on whether it is determined that the object has been registered in advance, through the identification processing of the object executed by the detection unit.

11. The control apparatus according to claim 1, wherein the camerawork decision unit is configured to decide the camerawork to be given to the moving images automatically captured based on the number of persons detected by the detection unit.

12. The control apparatus according to claim 1, wherein the camerawork decision unit is configured to acquire information of camerawork given to moving images captured in the past by the capturing control unit, and decide camerawork of a type different from types of camerawork given to at least a latest predetermined number of times of capturing as the camerawork to be given to the capturing of the moving images based the information of the camerawork given to the moving images captured in the past.

13. The control apparatus according to claim 1, wherein the camerawork decision unit is configured to decide the camerawork to be given to the moving images automatically captured based on positional information of a face detected by the detection unit.

14. The control apparatus according to claim 1, wherein the camerawork decision unit is configured to decide the camerawork to be given to the moving images automatically captured based on size information of a face detected by the detection unit.

15. The control apparatus according to claim 1, wherein the camerawork decision unit is configured to decide the camerawork to be given to the moving images automatically captured based on the information indicating the detection result of the object out of at least one camerawork candidate selected from a group including:

camerawork to zoom in to the object of a target to the capturing end position by taking a predetermined amount of time during the automatic capturing;

camerawork to zoom out from the detected object of the target to the capturing end position by taking the predetermined amount of time during the automatic capturing;

camerawork to start the automatic capturing from a capturing start position where the detected object of the target is not arranged within a capturing range of the image pickup unit and to pan the photographic optical system to a capturing end position where the detected object of the target is arranged within the capturing range during the automatic capturing;

camerawork to start the automatic capturing from a capturing start position where the detected object of the target is arranged within the capturing range of the image pickup unit and to pan the photographic optical system to a capturing end position where the detected object of the target is not arranged within the capturing range during the automatic capturing;

camerawork to start the automatic capturing from the capturing start position where the detected object of the target is not arranged within the capturing range of the image pickup unit and to tilt the photographic optical system to the capturing end position where the detected object of the target is arranged within the capturing range during the automatic capturing;

camerawork to start the automatic capturing from the capturing start position where the detected object of the target is arranged within the capturing range of the image pickup unit and to tilt the photographic optical system to the capturing end position where the detected object of the target is not arranged within the capturing range during the automatic capturing;

camerawork to start the automatic capturing from a capturing start position where the detected object of the target is out of focus of the photographic optical system and to change the focus to a capturing end position where the detected object of the target is in focus of the photographic optical system during the automatic capturing;

camerawork to start the automatic capturing from a capturing start position where the detected object of the target is in focus of the photographic optical system and to change the focus to a capturing end position where the detected object of the target is out of focus of the photographic optical system during the automatic capturing; and camerawork to start the automatic capturing from a capturing start position where a first object of a plurality of objects detected by the detection unit is arranged within the capturing range of the image pickup unit and to change a composition to a capturing end position where at least a second object different from the first object of the plurality of objects detected by the detection unit is arranged within the capturing range of the image pickup unit during the automatic capturing.

16. The control apparatus according to claim 1, wherein the camerawork decision unit is configured to perform the automatic capturing without giving the camerawork based on the information indicating the detection result of the object.

17. The control apparatus according to claim 1, wherein the camerawork decision unit is configured to decide the camerawork to be given to the moving images automatically captured before start of the automatic capturing by the capturing control unit.

18. An image pickup apparatus, comprising:
the control apparatus according to claim 1;
the image pickup unit; and
a rotation mechanism configured to perform at least one of pan-driving and tilt-driving of the image pickup unit by rotating the image pickup unit centering around at least one or more axes,
wherein the image pickup control apparatus is configured to control change of the composition by controlling rotation of the image pickup unit by the rotation mechanism.

19. A control method, comprising:
acquiring image data captured by an image pickup unit configured to acquire the image data based on light from a photographic optical system;
detecting an object from the image data;
performing automatic capturing control to output an instruction to start capturing to the image pickup unit without a user operation, to cause the image pickup unit to automatically capture moving images to be recorded; and
performing camerawork decision to decide camerawork to be given during recording to the moving images automatically captured from among a plurality of types of camerawork having different change patterns of at least one of a composition of recorded moving images and a focus of the photographic optical system based on information indicating a detection result of the object by the object detection, before the moving images to be recorded are captured; and
performing control to control at least one of the composition and the focus at a capturing start position based on a decision result from the camerawork decision unit before automatic capturing by the capturing control is started and change at least one of the composition and the focus with a pattern corresponding to the decision result to a capturing end position based on the decision result by the camerawork decision during the capturing of the moving images to be recorded.

20. The control apparatus according to claim 1, wherein the camerawork is a change pattern of at least one of the composition and the focus to be given to the moving images to be recorded to give a movement effect to the moving images to be recorded.

* * * * *